(12) United States Patent
Johnson et al.

(10) Patent No.: US 7,300,210 B2
(45) Date of Patent: Nov. 27, 2007

(54) BEARING LOCKING COLLAR WITH LAMINATED PLATES

(75) Inventors: James Johnson, Valparaiso, IN (US); James A. Parejko, Plainfield, IL (US); Patrick Tibbits, Valparaiso, IN (US)

(73) Assignee: Emerson Power Transmission Manufacturing, LLP, Maysville, KY (US)

( * ) Notice: Subject to any disclaimer, the term of this patent is extended or adjusted under 35 U.S.C. 154(b) by 0 days.

(21) Appl. No.: 10/753,626

(22) Filed: Jan. 8, 2004

(65) Prior Publication Data

US 2005/0152629 A1    Jul. 14, 2005

(51) Int. Cl.
    *F16C 19/06* (2006.01)
(52) U.S. Cl. ............... 384/537; 384/540; 384/541; 403/289
(58) Field of Classification Search ........... 384/537, 384/538, 540, 541, 542, 903; 403/289, 290; 24/270
See application file for complete search history.

(56) References Cited

U.S. PATENT DOCUMENTS

| | | | |
|---|---|---|---|
| 1,687,806 A * | 10/1928 | Strong | ............... 384/480 |
| RE17,838 E | 10/1930 | Gayman | |
| 2,136,819 A | 11/1938 | Large | |
| 2,168,469 A | 8/1939 | Brouwer | |
| 2,650,867 A | 9/1953 | Spieth | |
| 3,276,828 A | 10/1966 | Mansfield | |
| 3,304,140 A | 2/1967 | Homigold | |
| 3,354,672 A * | 11/1967 | Klaeui | ............... 66/84 R |
| 3,397,021 A | 8/1968 | Fitzsimmons | |
| 3,428,379 A | 2/1969 | Readman | |
| 3,602,534 A * | 8/1971 | Dragoo | ............... 403/343 |
| 3,625,555 A * | 12/1971 | Scott et al. | ............... 403/344 |
| 3,938,901 A | 2/1976 | Howe, Jr. | |
| 4,272,871 A * | 6/1981 | Weinhold | ............... 24/270 |
| 4,428,697 A * | 1/1984 | Ruland | ............... 403/344 |
| 4,537,519 A | 8/1985 | LaRou et al. | |
| 4,573,717 A * | 3/1986 | Peacock | ............... 24/270 |
| 4,575,265 A | 3/1986 | Tooley | |
| 4,728,202 A | 3/1988 | LaRou | |
| 4,969,923 A * | 11/1990 | Reeder et al. | ............... 24/270 |
| 5,863,137 A | 1/1999 | Johnson et al. | |
| 6,036,372 A | 3/2000 | Okamoto | |
| 6,129,456 A | 10/2000 | Okamoto | |

OTHER PUBLICATIONS

Corrigan et al., "Laminated Collar Design" Spring Semester 2003 Department of General Engineering University of Illinois at Urbana-Champaign.

* cited by examiner

*Primary Examiner*—Thomas R. Hannon
(74) *Attorney, Agent, or Firm*—McDonnell Boehnen Hulbert & Berghoff

(57) ABSTRACT

A locking collar comprising an annular collar having an outer surface, an inner surface, and a first end positioned opposite a second end defining a gap therebetween, and a locking component extending from the first end of the annular collar and into engagement with the second end of the annular collar, such that when the locking component is tightened, the first end and the second end are drawn together, and the annular collar is comprised of plates that are secured together to form a laminated locking collar.

22 Claims, 4 Drawing Sheets

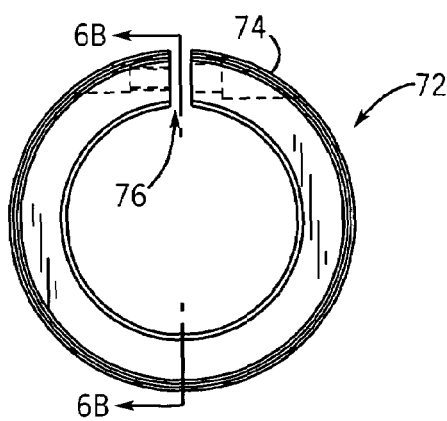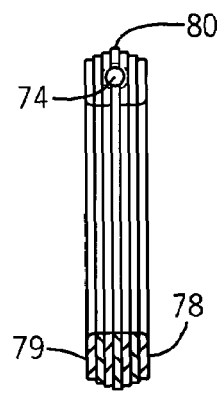
FIG. 6A    FIG. 6B
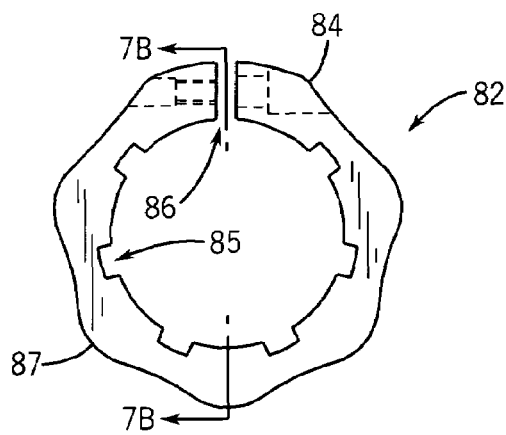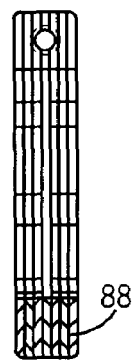
FIG. 7A    FIG. 7B
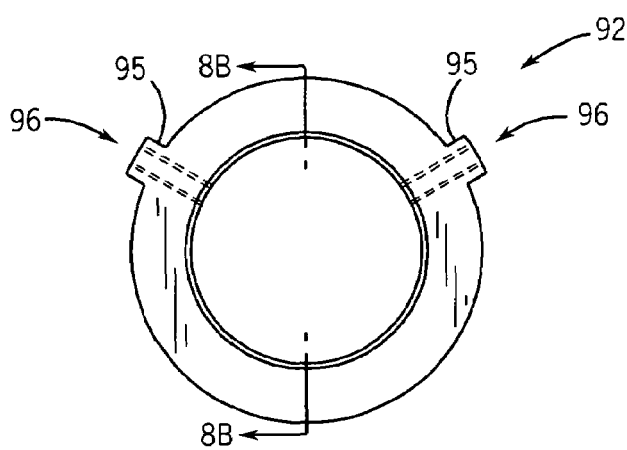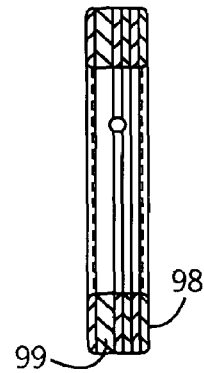
FIG. 8A    FIG. 8B

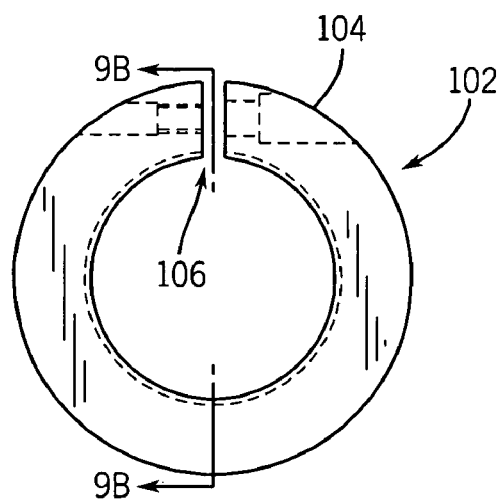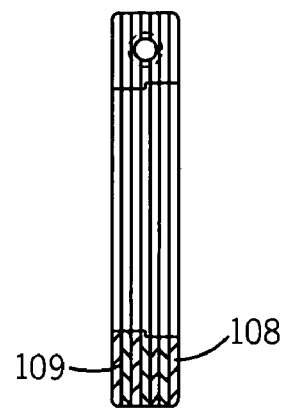
FIG. 9A  FIG. 9B
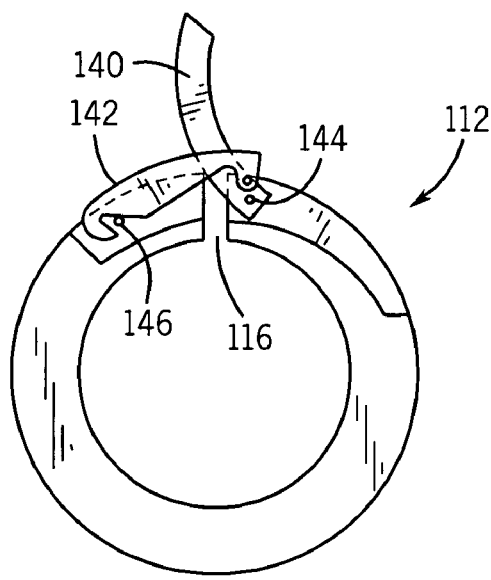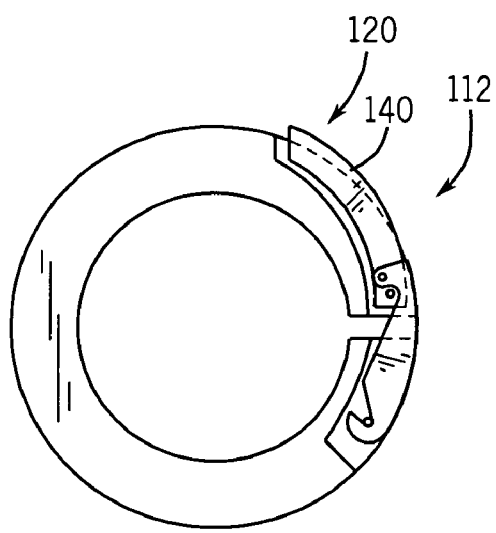
FIG. 10A  FIG. 10B

BEARING LOCKING COLLAR WITH LAMINATED PLATES

FIELD OF THE INVENTION

This invention is directed generally to the field of bearing assemblies, and more particularly to an improved locking collar for securing the inner bearing ring of a bearing assembly to a shaft.

BACKGROUND OF THE INVENTION

Various arrangements are known in the art for securing the inner ring of a bearing assembly onto a shaft. Such arrangements have included shaft engaging set screws and shaft-surrounding locking collars. Such locking collars may include locking or tightening means, generally in the form of one or more locking screws. In the so-called SKWEZLOC® arrangement disclosed in U.S. Pat. Nos. 4,537,519 and 4,728,203, the inner ring has finger extensions which, when compressed with a screw operated locking collar, tightly grip and hold the shaft. This finger extension/locking collar combination enhances the concentricity of the inner ring with the shaft and facilitates rotation of the shaft at higher speeds.

An improved bearing locking collar is disclosed in U.S. Pat. No. 6,200,039 incorporated herein by reference, where a bearing assembly is provided wherein the locking collar is pre-assembled on the inner bearing ring at the factory and may remain properly positioned on the inner bearing ring during installation onto a shaft. In one aspect, the inner diameter of the annular locking collar is provided with a protrusion which extends radially inwardly. When the locking collar is disposed about the finger extensions of the inner ring, the protrusion is disposed within a recessed groove which extends at least partially along the collective outer annular surface defined by the finger extensions for precisely locating and orienting the collar. A locking screw is tightened to deform the finger extensions into secure engagement with the shaft. Typically, the locking collars are manufactured from straight bar stock having a generally square cross-section. The bar stock is typically bent nearly 360 degrees such that the ends of the bar nearly meet. When the bar stock is bent, stresses are introduced into the locking collar, particularly at the portion of the locking collar located opposite from the locking screw. When the locking screw is tightened to secure the locking collar, the ends of the bar stock are drawn together. This results in the introduction of even further stresses in the locking collar. As a result, the bar stock must have a sufficiently large cross-sectional area to handle the stresses that are introduced during the manufacture of the locking collar as well as during the tightening of the locking screw. Alternatively, a solid cylindrical bar or thick-walled tube can be cut to the width of the locking collar, and the center machined away to create the annular locking collar. Using this method wastes a significant amount of material, is time-consuming, and very costly, but does eliminate the stresses introduced from bending. Moreover, it is only practical to provide a locking collar with circular inner and outer surfaces.

In addition, as disclosed in U.S. Pat. No. 6,200,039, the recesses or protrusions provided in the locking collar to mate with the finger extensions of the inner bearing ring must be machined into the locking collar. If the recesses or protrusions are machined into the bar stock while it is still straight and prior to bending, then the protrusions or recessions may become deformed or non-uniform during the bending process. However, it is more difficult and more costly to machine the recesses or grooves after the bar stock has been bent, or during the machining of a cylindrical bar or thick walled tube.

Accordingly, it is desirable to provide a bearing locking collar where the stresses are reduced or eliminated during the process of manufacture. It is also desirable to provide an easier or less costly method of manufacture. It is also desirable to provide a locking collar having a reduced cross-sectional area to reduce material costs. It is further desirable to provide a locking collar where recesses or grooves may be more easily provided on the inner surface of the locking collar. Finally, it is desirable to provide a locking collar having performance enhancing geometries, and a cost-effective method of making locking collars having such geometries.

SUMMARY OF THE INVENTION

Some of the present embodiments are directed to a locking collar that is comprised of a number of lamina or thin plates that are used to form a laminated locking collar. The laminated locking collar is made by stacking thin plates on top on one another and securing the plates together to form a unitary product. The plates may be secured together using any suitable technique including the use of adhesives, various types of welding, riveting, or any other method capable of securing the plates together to form a unitary product. As used herein the term "laminated locking collar" shall mean a locking collar comprised of plates that are secured together in any manner or fashion. The laminated locking collar can be manufactured without introducing the stresses that are typically introduced when bending bar stock. This allows for a locking collar having a reduced cross-sectional area because the laminated locking collar does not need the strength to account for the stresses introduced through bending. In addition, lamina or plates of differing geometries can be used to create recesses or protrusions as desired without requiring any machining. In addition, the laminated locking collar can allow for less time-consuming and less costly manufacture. Finally, the use of a laminated locking collar can provide for a greater variety of performance-enhancing geometries that were not possible or prohibitively expensive using prior manufacturing methods. In another aspect of the inventions, locking collars having performance-enhancing geometries are provided, which may or may not be laminated.

BRIEF DESCRIPTION OF THE DRAWINGS

Further advantages of the present invention will become apparent to those skilled in the art with the benefit of the following detailed description of the preferred embodiments and upon reference to the accompanying drawings in which:

FIG. 6A is a cross-sectional view of a laminated locking collar having a bend enhanced geometry and adapted for a locking screw.

FIG. 6B is a cross-sectional view of the laminated locking collar of FIG. 6A taken along the line 6B.

FIG. 7A is a cross-sectional view of a laminated locking collar having an alternative bend enhanced geometry and adapted for a locking screw.

FIG. 7B is a cross-sectional view of the laminated locking collar of FIG. 7A taken along the line 7B.

FIG. 8A is a cross-sectional view of a laminated locking collar adapted for use with two set screws.

FIG. 8B is a cross-sectional view of the laminated locking collar of FIG. 8A taken along the line 8B.

FIG. 9A is a cross-sectional view of a laminated locking collar having a moment moving geometry and adapted for a locking screw.

FIG. 9B is a cross-sectional view of the laminated locking collar of FIG. 9B taken along the line 9B.

FIG. 10A is a side view of a locking collar with a cam and latch locking component shown in an open position.

FIG. 10B is another side view of the locking collar of FIG. 10A shown in a nearly closed position.

Figure 1:
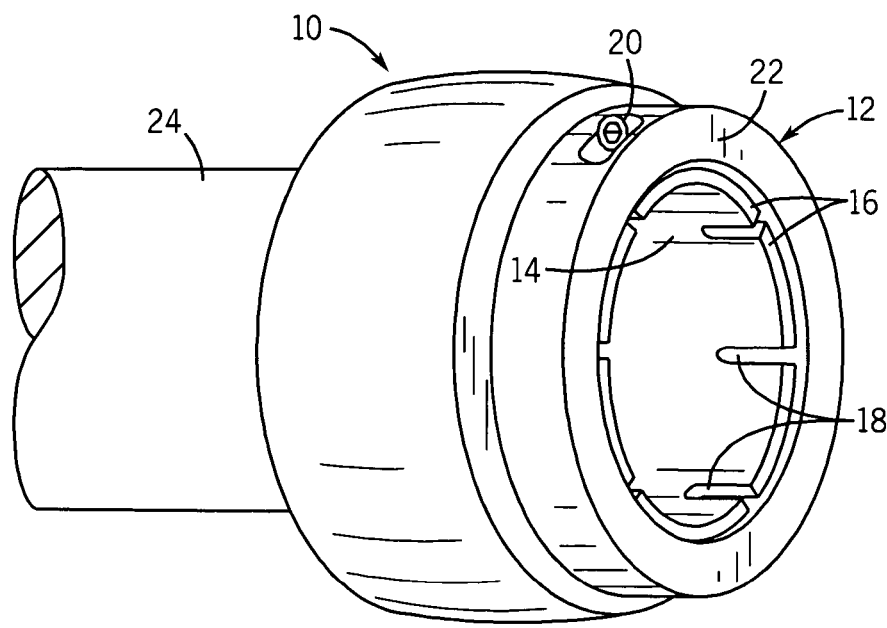
FIG. 1 is a perspective view of a locking collar shown positioned over the inner ring of a bearing assembly.

While the invention is susceptible to various modifications and alternative forms, specific embodiments thereof are shown by way of example in the drawings and will herein be described in detail. It should be specifically understood with respect to the drawings, that the drawings are of preferred alternate embodiments, and there are many other embodiments and forms in which the present invention may appear. It should also be understood that the drawings and detailed description thereof are not intended to limit the invention to the particular form disclosed, but on the contrary, the invention is to cover all modifications, equivalents and alternatives falling within the spirit and scope of the present invention or within the scope of the appended claims.

In addition, while the present invention is particularly useful in applications for use in applications securing an inner bearing ring to a shaft, the locking collar of the present invention may be used for any other application where the use of a locking collar would be useful or suitable.

DETAILED DESCRIPTION OF THE PREFERRED EMBODIMENT

A bearing assembly 10 and locking collar 12 are shown in FIG. 1. The bearing assembly 10 includes an annular inner ring 14 having finger extensions 16 with slots 18 positioned therebetween. A locking component, in this case a locking screw 20 is threaded tangentially through the locking collar 12 normal to a gap 22 between the ends of the locking collar 12. The locking screw 20 is shown recessed into the locking collar 12 and preferably receives a hexagonal wrench (not shown). As the locking screw 20 is tightened, the ends of the locking collar 12 are drawn together to effectively reduce the inner diameter of the locking collar and thereby radially compress the finger extensions 16 to secure engagement with a shaft 24. Other types of locking components can be used as well, including the cam and latch assembly discussed in FIGS. 10a and 10b below, and other means suitable to draw the ends of the locking collar together.

Figure 2A:
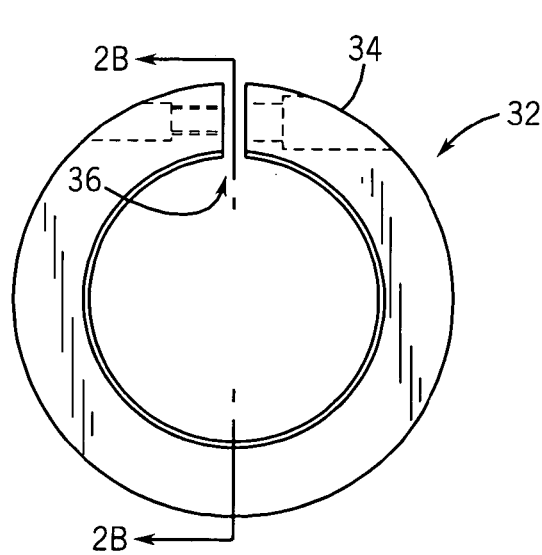
FIG. 2A is a cross-sectional view of a locking collar of the type shown in FIG. 1 that is laminated and adapted for use with a locking screw.
Figure 2B:
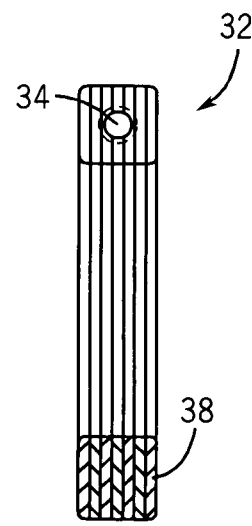
FIG. 2B is a cross-sectional view of the laminated locking collar of FIG. 2B taken along the line 2B.

FIG. 2a shows a locking collar 32 with a locking screw recess 34 and a gap 36 between the ends of the locking collar. FIG. 2b shows a cross-sectional view of the locking collar in FIG. 2a formed from lamina or thin plates 38 that have been laminated together to form a unitary locking collar. The thin plates 38 are preferably formed from a simple stamping operation. Alternatively, the thin plates 38 could be molded or machined to form the desired geometry. For most applications, the thin plates are preferably formed of a low to mild alloy steel, having a thickness on the order of 0.050 of an inch. Of course, any type of suitable material may be used including composite materials such as Kevlar, and brass or stainless steel depending on the application. The thin plates 38 can be joined together using a number of techniques including friction welding, resistive welding, magnetic pulse welding, laser welding, brazing, riveting, deformation staking or even ultrasonic welding. In addition, an adhesive can be used to join the thin plates 38 together. It is presently believed that the best manner of securing the thin plates together is through the use of rivets, where the maximum spacing between rivets preferably does not exceed approximately half of the circumference of the locking collar. Thus, in many applications preferably six rivets are used. In the locking collars where locking screws are used, the locking screws are typically made from a high alloy steel such as 4130 or 4140.

Figure 3A:
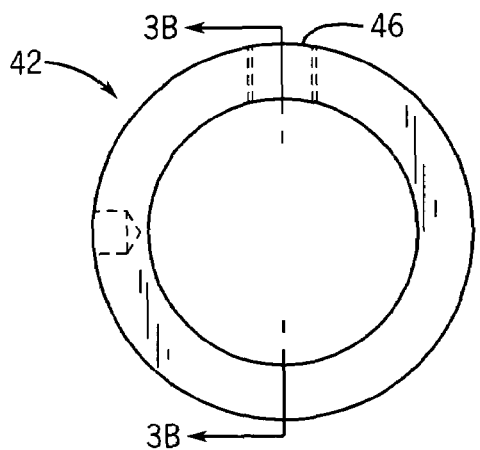
FIG. 3A is a cross-sectional view of a laminated locking collar adapted for use with a single set screw.
Figure 3B:
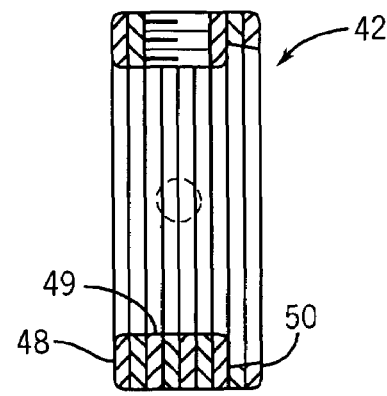
FIG. 3B is a cross-sectional view of the laminated locking collar of FIG. 3A taken along the line 3B.

FIG. 3a shows a locking collar 42 with a set screw receptor 46. In operation, a set screw is screwed through set screw receptor 46 to secure engagement with a shaft. FIG. 3b shows the locking collar 42 of FIG. 3a formed from lamina or thin plates 48, 50 that have been laminated together to form a unitary locking collar. The thin plates 48 and 50 may be of varying geometries. As show in FIG. 3b, the thin plates 48 have a smaller inner diameter than the thin plates 50. Thus, the laminated locking collar can have various geometries, by altering the geometry of one or more of the thin plates used. In FIG. 3b, the locking force of the set screw will be opposed by the inner surfaces 49 of thin plates 48. The laminated locking collar in this instance provides for a greater thickness of the locking collar, which in turn allows for a set screw receptor 46 having a greater diameter. In addition, FIG. 3b shows that the cross-sectional area of the annular region in plates 50 is greater at the top near set screw receptor 46 than at the bottom. This provides for a camming effect to be utilized in connection with a similarly configured eccentric lobe on the inner bearing ring of a bearing assembly, that upon rotation allows for a cam locking effect, or eccentric lock.

Figure 4A:
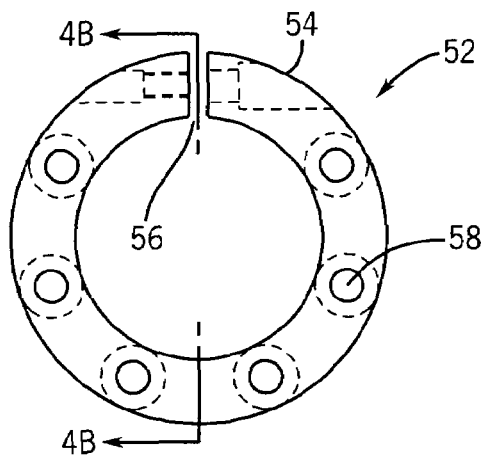
FIG. 4A is a cross-sectional view of a laminated and hinged locking collar adapted for use with a locking screw.
Figure 4B:
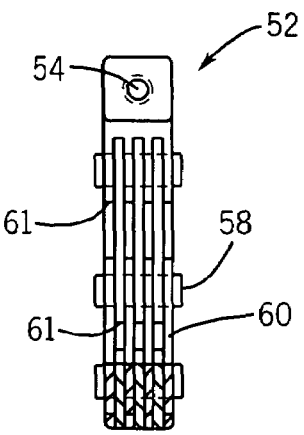
FIG. 4B is a cross-sectional view of the laminated locking collar of FIG. 4A taken along the line 4B.

FIG. 4a shows a locking collar 52 with a locking screw recess 54 and a gap 56 between the ends of the locking collar. FIG. 4b shows a cross-sectional view of the locking collar in FIG. 4a formed from lamina or thin plates 60 that have been laminated together to form a unitary locking collar. The thin plates 60 are shown held together by use of hinge pins 58. In this example, six different hinge pins 58 are used to secure the lamina or thin plates 60 together into a unitary member. In this embodiment, the lamination technique is used to provide a hinged locking collar 52 where hinge pins 58 serve as hinges adjacent hinged portions 61. A hinged locking collar serves to further eliminate stresses introduced during the manufacturing process, by limiting induced stresses to those caused from contact with the with the inner surface of the locking collar. A hinged collar also allows for the locking screw to provide greater clamping force because, with the hinged design, the locking screw does not have to exert a force to bend the locking collar when drawing the ends of locking collar together.

Figure 5A:
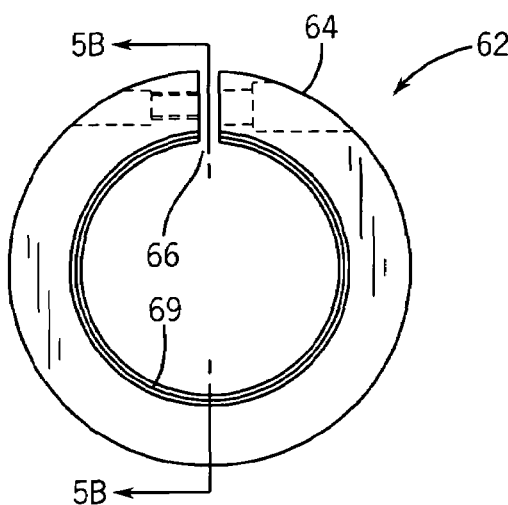
FIG. 5A is a cross-sectional view of a laminated locking collar adapted for a locking screw and having a protrusion on the inner surface.
Figure 5B:
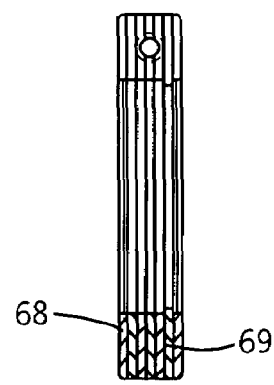
FIG. 5B is a cross-sectional view of the laminated locking collar of FIG. 5A taken along the line 5B.

FIG. 5a shows a locking collar 62 with a locking screw recess 64 and a gap 66 between the ends of the locking collar. FIG. 5b shows a cross-sectional view of the locking collar in FIG. 5a formed from lamina or thin plates 68, 69 that have been laminated together to form a unitary locking collar. The thin plates 68, 69 may be made having differing geometries. In FIGS. 3a and 3b, thin plate 69 is shown having an inner diameter that is smaller than the inner diameters of the thin plates 68. In this manner, thin plate 69 may serve as a protrusion extending from the inner surface of the locking collar 62 that may be adapted to engage a complementary groove or recess positioned on the outer surface of the inner ring or finger extensions of a bearing, as taught and disclosed in U.S. Pat. No. 6,200,039. Thus, using the laminated locking collar having thin plates of varying geometry can eliminate the need for costly machining, and yet provide for performance enhancing operation.

FIG. 6a shows a locking collar 72 with a locking screw recess 74 and a gap 76 between the ends of the locking collar. FIG. 6b shows a cross-sectional view of the locking collar in FIG. 6a formed from lamina or thin plates 78 that have been laminated together to form a unitary locking collar. The thin plates 78 may be made having differing geometries. In FIG. 6b, thin plate 80 is shown having an outer diameter that is larger than the outer diameter of thin plate 79. In this manner, the cross-sectional geometry about locking screw recess 74 can be variable. Here, the geometry about the locking screw recess is just large enough to house the locking screw recess. With this geometry, providing a smaller cross-sectional area, the gap 76 between the ends of the locking collar can be drawn together more easily and with less force than in the example where the thin plates have the same inner and outer diameter dimensions as shown for example in FIG. 2b. Thus, the versatile nature of the laminated locking collar design can provide alternate performance enhancing geometries just by varying the diametral dimensions of the lamina or thin plates.

FIG. 7a shows a locking collar 82 with a locking screw recess 84 and a gap 86 between the ends of the locking collar. FIG. 7b shows a cross-sectional view of the locking collar in FIG. 7a formed from lamina or thin plates 88 that have been laminated together to form a unitary locking collar. The thin plates 78 are shown in this example with each having the same geometries. The locking collar itself, however, has a performance enhancing geometry in that it includes a series of notches 85 on an inner surface of the locking collar as well as corresponding larger diameter portions 87 on the outer surface positioned radially between the notches. When the locking screw is tightened, the notches 85 allow the locking collar to more easily flex, thus allowing the locking collar to be secured more easily and with less force. This design also reduces material costs. Furthermore, it would be prohibitively expensive and impractical to provide a locking collar having the geometry shown using machining techniques on a conventionally manufactured locking collar. While the notches are shown with square corners for illustrative purposes, in practice the notches would preferably be rounded to reduced stress concentrations.

FIG. 8a shows a locking collar 92 with a set screw receptors 96. In operation, a set screw is screwed through both set screw receptors 96 to secure engagement with a shaft. FIG. 8b shows the locking collar 92 of FIG. 8a formed from lamina or thin plates 98, 99 that have been laminated together to form a unitary locking collar. The thin plates 98, 99 may be of varying geometries. As show in FIG. 8b, the thin plates 98 have a smaller thickness than the thin plate 99. Thus, the laminated locking collar can have various geometries, by altering the geometry or thickness of one or more of the thin plates used. In FIG. 8a, the locking collar 92 includes set screw receptor extensions 95 that allow for the locking collar to have a smaller outer diameter than would ordinarily be attainable when using conventional manufacturing techniques. The use of the set screw receptor extensions 95 allows the locking collar to be manufactured using less material and without the need for difficult and costly machining operations to form the set screw receptor extensions 95.

FIG. 9a shows a locking collar 102 with a locking screw recess 104 and a gap 106 between the ends of the locking collar. FIG. 9b shows a cross-sectional view of the locking collar in FIG. 9a formed from lamina or thin plates 108, 109 that have been laminated together to form a unitary locking collar. The thin plates 108, 109 may be made having differing geometries. In FIGS. 9a and 9b, thin plates 109 are shown having an inner diameter that is smaller than the inner diameters of the thin plates 108. In this manner, thin plates 109 may serve as a protrusion extending from the inner surface of the locking collar 102 that may be adapted to engage a complementary groove or recess positioned on the outer surface of the inner ring or finger extensions of a bearing, as taught and disclosed in U.S. Pat. No. 6,200,039. Thus, using the laminated locking collar having thin plates of varying geometry can eliminate the need for costly machining, and yet provide for performance enhancing operation. In addition, the thin plates 109 may abut a protrusion positioned at the end of the finger extensions or tangs of the inner ring of the bearing assembly, such that thin plates 108 extend beyond the end of the finger extensions (See FIG. 1). Alternatively, the locking collar shown could be flipped 180 degrees from the position shown in FIG. 9b such that the thin plates 108 extend over the finger extensions or tangs of the inner ring of the bearing assembly, such that the thin plates 109 extend beyond the end of the finger extensions (See FIG. 1). In either case, when the locking screw is tightened, a moment is created that causes the bottom portion of the locking collar positioned opposite of the locking screw to tend to rotate. The embodiments shown in FIG. 9 tend to counteract the moment that is created because of the abutment with the end of the finger extensions of the inner bearing ring, and thereby prevent any cocking of the locking collar that might otherwise occur. In addition, because the thin plates 109 have a smaller inner diameter than thin plates 108, more force will be required to draw the ends of the locking collar together in the region of thin plates 109. Therefore, a moment will be created that tends to pull the locking collar inwardly toward the bearing assembly, and resulting in a stronger, more positive, attachment with the bearing assembly.

FIG. 10a shows a locking collar 112 that does not include a locking screw, but instead uses a cam latch to draw the ends of the locking collar together. With this design, a more reliable means for tightening the locking collar to secure the inner ring of a bearing to a shaft is provided. In the case of a locking screw, the amount of clamping force is limited by the size and strength of the locking screw. With the cam latch design, the force may exceed that of a locking screw on a comparably sized locking collar. The cam latch is shown in FIGS. 10a and 10b. Locking collar 112 is shown having a gap 116 between the ends of the locking collar. A latch 142 is shown operationally engaged with cam 140. Latch 142 is placed over latchhold 142 which may be a pin. As cam 140 is moved away from the latchhold the ends of the locking collar are drawn together. In FIG. 10b, when a force in the direction of arrow 120 is applied to the cam 140 the ends of the locking collar are drawn together. The latch and cam as shown in FIG. 10b become relatively flush with the surfaces of the locking collar to help improve the dynamic balance of the locking collar. Thus, FIGS. 10a and 10b show an alternative method of drawing the ends of the locking collar together. This design would also be suitable for a laminated thin plate design.

In the case of a locking collar where a locking screw is used, material is removed from the collar to accommodate the locking screw bore and provide a recess for the locking screw. This may result in the locking collar becoming unbalanced. An unbalanced locking collar may tend to vibrate or reduce operational performance, particularly in high speed rotation applications. One way to dynamically balance an unbalanced locking collar is to add or remove material opposite the locking screw, much like is done during wheel balancing. When using a laminated design, the desired added or removed material can be accounted for in the geometry of the plates that are used, such that the added or removed material is "designed" into the geometry of the plates so that material is not actually added or removed. Thus, the use of laminated plates may be used to provide a dynamically balanced locking collar without having to add or remove material after the locking collar is formed.

In FIGS. 2-10 a number of examples of the present invention are shown. It will be appreciated that these embodiments are only exemplary in nature and that the present invention could embody the various features from each of the embodiments as well as include geometries not shown. Furthermore, the description of the materials used and the methods for making the laminations are discussed above in connection with FIG. 2, but apply to all of the embodiments shown herein. In addition, while the thin plates are shown having generally coplanar surfaces, this is in no way required by the invention and the plates could have irregular surfaces, nesting surfaces, tapered surfaces, etc.

While certain features and embodiments of the invention have been described herein, it will be readily understood that the invention encompasses all modifications and enhancements within the scope and spirit of the present invention.

The invention claimed is:

1. A locking collar comprising:
an annular collar having an outer surface, an inner surface, and a first end positioned opposite a second end defining a gap therebetween;
a locking component extending from the first end of the annular collar and into engagement with the second end of the annular collar, such that when the locking component is tightened, the first end and the second end are drawn together to reduce the gap therebetween; and
wherein the annular collar is comprised of plates that are secured together to form a laminated locking collar.

2. The locking collar of claim 1, wherein one or more of the plates has an inner diameter smaller than an inner diameter of the other plates to form a protrusion.

3. The locking collar of claim 2, wherein the protrusion is adapted to be received in corresponding groove positioned on an outer surface of an inner bearing ring.

4. The locking collar of claim 1, wherein one or more of the plates has an inner diameter greater than an inner diameter of the other plates to form a recess.

5. The locking collar of claim 4, wherein the recess is adapted to receive a corresponding protrusion positioned on an outer surface of an inner bearing ring.

6. The locking collar of claim 1, wherein the plates at an outer axial periphery of the collar have an outer diameter that is less than an outer diameter of a centrally located plate.

7. The locking collar of claim 1, wherein the inner surface of the collar has a plurality of spaced notches.

8. The locking collar of claim 7, wherein the outer surface of the collar has a plurality of extending portions spaced radially between the notches.

9. The locking collar of claim 1, wherein plates positioned at an inner periphery of the collar have an inner diameter that is less than the inner diameter of plates positioned at an axial outer periphery of the collar.

10. The locking collar of claim 1, wherein the annular collar has one or more hinged sections.

11. A locking collar comprising:
an annular collar having an outer surface, an inner surface;
a set screw receptor extending from the outer surface to the inner surface;
and wherein the annular collar is comprised of plates that are secured together to form a laminated locking collar.

12. The locking collar of claim 11 wherein a portion of the inner surface through which the set screw receptor extends has an inner diameter that is less than an inner diameter of plates positioned adjacent thereto.

13. The locking collar of claim 11, wherein the outer surface of the collar includes a set screw receptor extension.

14. The locking collar of claim 11, wherein there are two or more set screw receptors that extend from the outer surface to the inner surface.

15. The locking collar of claim 14, wherein at the outer surface of the collar has at least two set screw receptor extensions.

16. A locking collar comprising:
an annular collar having an outer surface, an inner surface, and a first end positioned opposite a second end defining a gap therebetween;
a locking component extending from the first end of the annular collar and into engagement with the second end of the annular collar, such that when the locking component is tightened, the first end and the second end are drawn together to reduce the gap therebetween; and
wherein the locking collar has a performance-enhancing geometry, and wherein the annular collar is comprised of plates that are secured together to form a laminated locking collar.

17. The locking collar of claim 16, wherein the performance-enhancing geometry comprises having an outer diameter of the outer surface of the annular collar at outer axial peripheries thereof that is less than the outer diameter of the outer surface of the annular collar at a central portion thereof.

18. The locking collar of claim 16, wherein the performance-enhancing geometry comprises a plurality of spaced notches positioned on the inner surface of the annular collar.

19. The locking collar of claim 16, wherein the performance-enhancing geometry comprises a plurality of spaced regions of an increased outer diameter of the annular collar.

20. The locking collar of claim 16, wherein the performance-enhancing geometry comprises having an inner portion of the inner surface of the annular collar having a smaller diameter than an outer axial portion of the inner surface of the annular collar.

21. The locking collar of claim 16, wherein the performance-enhancing geometry serves to provide a dynamically balanced locking collar.

22. A locking collar comprising:

an annular collar having an outer surface, an inner surface, and a first end positioned opposite a second end defining a gap therebetween;

a latch and cam assembly extending from the first end of the annular collar and into engagement with the second end of the annular collar, such that when the cam is forced away from a latchhold, the first end and the second end are drawn together to reduce the gap therebetween and wherein the annular collar is comprised of plates that are secured together to form a laminated locking collar.

* * * * *